Figure 1:
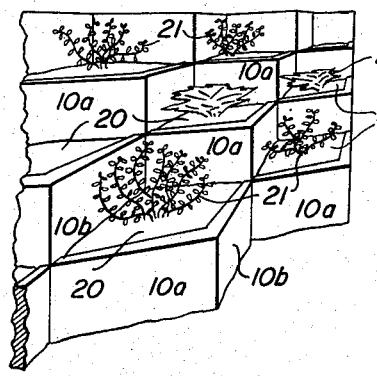

Nov. 22, 1960 L. FREHNER 2,960,797
LANDSCAPE TERRACE CONSTRUCTION AND PLANTER BLOCK THEREFOR
Filed Dec. 22, 1959

INVENTOR.
LEON FREHNER
BY *Mallinckrodt and Mallinckrodt*
ATTORNEYS

United States Patent Office 2,960,797
Patented Nov. 22, 1960

2,960,797

LANDSCAPE TERRACE CONSTRUCTION AND PLANTER BLOCK THEREFOR

Leon Frehner, 2129 S. 20th East, Salt Lake City, Utah

Filed Dec. 22, 1959, Ser. No. 861,256

8 Claims. (Cl. 47—33)

This invention relates to the art of building construction, and has particular reference to exterior structures in the nature of retaining walls.

In the landscaping of many homes and other properties, both private and public, there are often hillsides to be considered. While hillsides can be and often are seeded to grass, there are many instances where it would be far more desirable to avoid the problems of caring for steeply sloping lawns. Moreover, landscape architects often wish to produce unique planting effects. Steep slopes of all kinds offer splendid opportunities for this, but it is usually difficult to avoid excessive water run-off and consequent undesirable soil erosion.

The present invention is concerned with providing landscape architects with a new structural medium in the form of a special, masonry, planter block, which can be used to particular advantage for building sloping retaining walls, in terracing for example, wherein run-off is controlled and beautiful landscaping effects are possible.

Among the objects of the invention are:

To ornamentally contain steep slopes against the erosive forces of wind, water, and gravity;

To effectively provide, ornamentally, for the containment and retention of moisture within a bank or hillside;

To permit the planting of structurally retained, steep areas, so as to take away the ugliness and barrenness of customary retaining walls;

To provide planter blocks for retaining purposes of a size which can be easily handled and used in places where ordinary wall construction would be difficult or impossible;

To provide planter blocks adapted to be laid up without mortar;

To provide a retaining structure which is less costly than retaining walls; and

To provide for the erection of pyramidal mounds which can be planted ornamentally as landscaping and used for screening and wind break purposes where required.

An outstanding feature in the achievement of these objects is the utilization of masonry blocks which may be regarded as convexo-concave in formation without departing too far from the precise meaning of that term. Each block has a broad front face, which is convex in the sense of having its midportion protuberant, and a broad back face, which is concave in the sense of having its midportion recessed. Blocks of this type are arranged end to end and staggered in successive courses, which are offset backwardly from bottom to top of the retaining wall structure.

Another feature of the invention is the provision of a special form of convexo-concave masonry block for the purpose, such block having the lower end of each vertex notched at and open to its convex front face and its bottom surface so as to receive, in mating relationship therewith, contiguous ends of forwardly adjoining, similar blocks in retaining wall structure erected from a plurality of such blocks in the manner aforesaid.

Specific embodiments representing what is presently regarded as the best mode of carrying out the invention are illustrated in the accompanying drawings.

Figure 3:
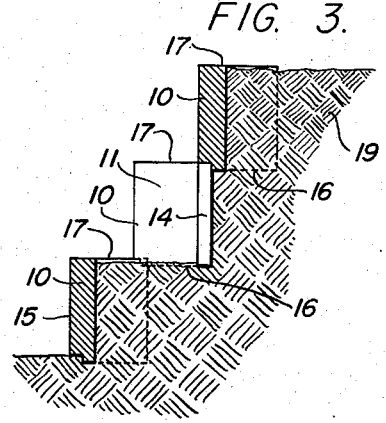
Figure 2:
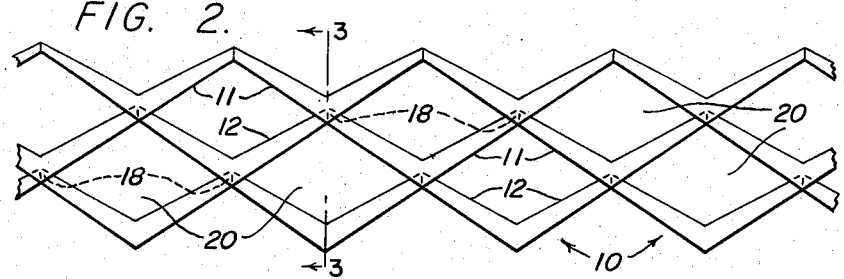
Figure 4:
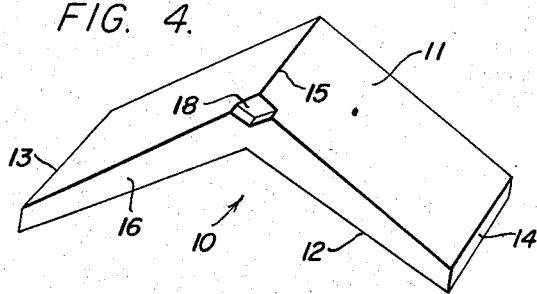
Figure 6:
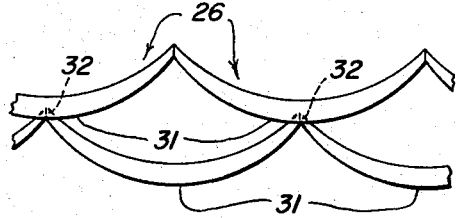
Figure 5:
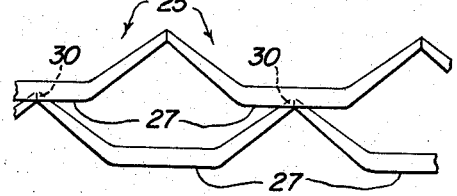

In the drawings:

Fig. 1 represents a view in perspective of a landscape terrace construction conforming to the invention;

Fig. 2, a top plan;

Fig. 3, a vertical section taken along the line 3—3 of Fig. 2;

Fig. 4, a perspective view looking at the bottom of one of the planter blocks used in the construction of Fig. 1;

Fig. 5, a fragmentary top plan drawn to a reduced scale and showing an assembly of snub-nosed planter blocks conforming to the invention, notch interlocks between blocks of successive courses being indicated by dotted lines; and Fig. 6, a similar view showing an assembly of arcuately configurated planter blocks.

Referring to the drawings:

In the embodiment of Figs. 1–4, the individual planter blocks 10, see particularly Fig. 4, are of widespread V configuration presenting an upright front face 11, which is broad and convex, and an upright back face 12, which is correspondingly broad but concave in formation. These two faces define front convexity and back concavity for the block, which may be regarded as being of convexo-concave formation.

Intermediate the width of the block 10 and at the convex front face 11 thereof between mutually opposite ends 13 and 14 is an upright vertex 15, which extends between bottom surface 16 and top surface 17 of the block. Such bottom and top surfaces are narrow relative to the broad front and back faces 11 and 12, respectively. The ends 13 and 14 are preferably in the form of narrow end faces, as shown, which are parallel to a vertex bisecting axial plane.

As shown, the blocks are preferably of uniform height throughout what may be regarded as either their lengths or their widths.

In the lower end of the vertex 15, at and opening into the bottom surface 16, is a recess or notch 18 configurated to receive in mating relationship therewith upper contiguous ends of forwardly adjoining similar blocks, see particularly Figs. 2 and 3.

The individual blocks 10 are shaped to final configuration from a hard-setting cementitious material, usually concrete molded to shape.

In the utilization of the blocks to construct terraced retaining wall structure, for example that shown in Figs. 1–3, they are laid in backwardly offset courses up the earth slope being covered. The blocks in each course are placed end to end and are staggered in position from course to course, so that each set of adjoining ends is received by the notch 18 of a block in the next higher course.

It should be noted that the bottoms of blocks in a higher course are positioned at a slightly lower level than the tops of the blocks in the next lower course, see Fig. 3, and that their midportions protrude forwardly into contiguous relationship with adjoining end portions of such blocks in the next lower course. While the positive interlocking engagement of the blocks afforded by the notches 18 is much to be preferred, it can be seen that a somewhat similar though much less desirable terracing arrangement could be attained with the same blocks not notched and not overlapped from course to course.

As so assembled, the blocks are backed up and supported by the sloped earth formation 19 which they serve to cover. Between the blocks of successive courses are defined individual planter areas 20 of earth, serving as a medium for the planting and growth of vegetation 21.

Each of the planter areas 20 is defined by a single block 10 of a lower course and by mutually contiguous opposite wing members 10b and 10a, respectively, of two mutually adjacent blocks 10 which are located immediately behind such single block in the next higher course. Such wing members define a backwardly extending concavity which, together with the forwardly extending concavity of the forwardly disposed single block, mark out an individual planter area in the particular course of which the single block forms a part. The wing members 10b and 10a provide, in effect, an ornamental background facing for the individual planter area concerned.

The planter blocks 25 and 26 of Figs. 5 and 6, respectively, are generally similar to the planter block 10, but are snub-nosed. As such, they represent possible variations in vertex configuration.

Thus, each block 25 actually has a broad vertex 27 disposed intermediate the width of its front face as a snub nose. A recess or notch 30 corresponding to 18 of blocks 10 is provided at the lower end of the vertex intermediate the width of the snub nose to serve the same purpose as the recesses or notches 18 in the assembly of the blocks into the terraced retaining wall formation shown in Fig. 5.

Each block 26 is of arcuate formation having an indistinct, arcuate vertex 31 intermediate the width of the front face of the block as a snub nose. Again, a recess or notch 32 corresponding to 18 of blocks 10 is provided at the lower end of vertex 31 intermediate the width of the block to serve the same purpose as the recesses or notches 18 in the assembly of the blocks into the terraced retaining wall formation shown in Fig. 6.

Whereas there are here illustrated and described certain preferred constructions which I presently regard as the best mode of carrying out my invention, it should be understood that various changes may be made without departing from the disclosed inventive subject matter particularly pointed out and distinctly claimed herebelow.

I claim:

1. A masonry planter block for landscape terrace construction, comprising masonry material shaped to present front and back faces, which are broad and upright and respectively define front convexity and back concavity for the block with an upright vertex intermediate the width of the block, and to present relatively narrow bottom and top surfaces and mutually opposite ends, said masonry material being further shaped to define a notch in the lower end of the vertex at and opening into the front of the block and at and opening into said bottom surface, said notch being restricted in its extent to the outer and bottom vertical area of said block and being configurated to snugly receive, in mating relationship therewith, upper contiguous ends of forwardly adjoining similar blocks in retaining-wall structure erected from a plurality of said blocks placed end to end and staggered in backwardly offset courses.

2. The masonry planter block of claim 1, wherein the height of the block is substantially uniform throughout its length.

3. The masonry planter block of claim 2, wherein the block is of widespread V formation.

4. The masonry planter block of claim 2, wherein the block is of arcuate formation.

5. Landscape terrace construction, comprising a sloping earth-retaining wall structure made up of a plurality of courses of masonry blocks of substantially convexo-concave formation laid end to end in each course and staggered in position from course to course, the blocks of each higher course being offset backwardly from the blocks of the next lower course, with their bottoms at a lightly lower level than the tops of the latter blocks and with their midportions protruding forwardly into contiguous relationship with adjoining end portions of said latter blocks, each of said masonry blocks comprising masonry material shaped to present front and back faces, which are broad and upright and respectively define front convexity and back concavity for the block with an upright vertex intermediate the width of the block, and to present relatively narrow, bottom and top surfaces and mutually opposite ends, said masonry material being further shaped to define a notch in the lower end of the vertex at and opening into the front of the block and at and opening into said bottom surface, said notch being configurated to receive in mating relationship therewith upper contiguous ends of forwardly adjoining similar blocks and the adjoining ends of the blocks in each lower course being snugly fitted into the vertex notches of the blocks of the next higher course; wherein the earth between the blocks of successive courses serves as a planting medium.

6. The landscape terrace construction of claim 5, wherein the height of each block is substantially uniform throughout its length.

7. The landscape terrace construction of claim 6, wherein each block is of widespread V formation.

8. The landscape terrace construction of claim 6, wherein each block is of arcuate formation.

References Cited in the file of this patent

UNITED STATES PATENTS

| | | |
|---|---|---|
| 2,082,457 | Martinichio | June 1, 1937 |
| 2,313,363 | Schmitt | Mar. 9, 1943 |
| 2,911,794 | Pearson | Nov. 10, 1959 |

FOREIGN PATENTS

| | | |
|---|---|---|
| 192,665 | Austria | Oct. 25, 1957 |